United States Patent [19]

Ashauer et al.

[11] Patent Number: 4,605,087
[45] Date of Patent: Aug. 12, 1986

[54] ALL-WHEEL DRIVE SYSTEM FOR VEHICLES

[75] Inventors: Karl Ashauer, Wolfsburg; Bernd Richter, Bokensdorf; Manfred Kalversberg; Rudiger Schmidt, both of Wolfsburg, all of Fed. Rep. of Germany

[73] Assignee: Volkswagenwerk Aktiengesellschaft, Wolfsburg, Fed. Rep. of Germany

[21] Appl. No.: 608,471

[22] Filed: May 9, 1984

[30] Foreign Application Priority Data

May 11, 1983 [DE] Fed. Rep. of Germany ....... 3317247

[51] Int. Cl.$^4$ .......................................... B60K 17/344
[52] U.S. Cl. ................... 180/248; 180/233; 180/244
[58] Field of Search ................... 180/233, 247–250, 180/244

[56] References Cited

U.S. PATENT DOCUMENTS

| 2,751,029 | 6/1956 | Dixon | 180/244 |
| 2,835,143 | 5/1958 | Kelbel | 180/250 |
| 2,884,101 | 4/1959 | Warn | 192/44 |
| 2,959,237 | 11/1960 | Hill | 180/249 |
| 3,339,661 | 9/1967 | Hill et al. | 180/249 |
| 3,827,520 | 8/1974 | Mueller | 180/249 |
| 3,993,152 | 11/1976 | Fogelberg | 180/249 |
| 4,124,085 | 11/1978 | Fogelberg | 180/249 |

FOREIGN PATENT DOCUMENTS

| 49961 | 4/1982 | European Pat. Off. | 180/244 |
| 1129841 | 5/1962 | Fed. Rep. of Germany . | |
| 1193316 | 5/1965 | Fed. Rep. of Germany . | |
| 2740638 | 3/1978 | Fed. Rep. of Germany . | |
| 3034229 | 4/1981 | Fed. Rep. of Germany . | |
| 3016788 | 11/1981 | Fed. Rep. of Germany . | |
| 3127605 | 1/1983 | Fed. Rep. of Germany . | |
| 71629 | 6/1981 | Japan | 180/233 |
| 727917 | 4/1955 | United Kingdom | 180/248 |
| 1577960 | 10/1980 | United Kingdom . | |

Primary Examiner—Samuel Scott
Assistant Examiner—Noah P. Kamen
Attorney, Agent, or Firm—Brumbaugh, Graves, Donohue & Raymond

[57] ABSTRACT

In the particular embodiments described in the specification, an all-wheel drive system is disclosed wherein either the wheels of both the front axle and the rear axle of a vehicle are driven continuously and the front axle and rear axle can be rigidly coupled with each other, or wherein the wheels of only one axle are driven continuously while the drive for the wheels of the second axle can be obtained automatically by means of a viscosity clutch arranged in the driving train between the front axle and the rear axle so that the front and the rear axles are coupled with each other essentially rigidly according to the torque. In addition, one or more coupling devices are provided which are constructed so that a decrease in the rotational speed of the front wheels, caused in particular by the actuation of the service brake, cannot be transmitted through the driving train to the rear wheels.

8 Claims, 4 Drawing Figures

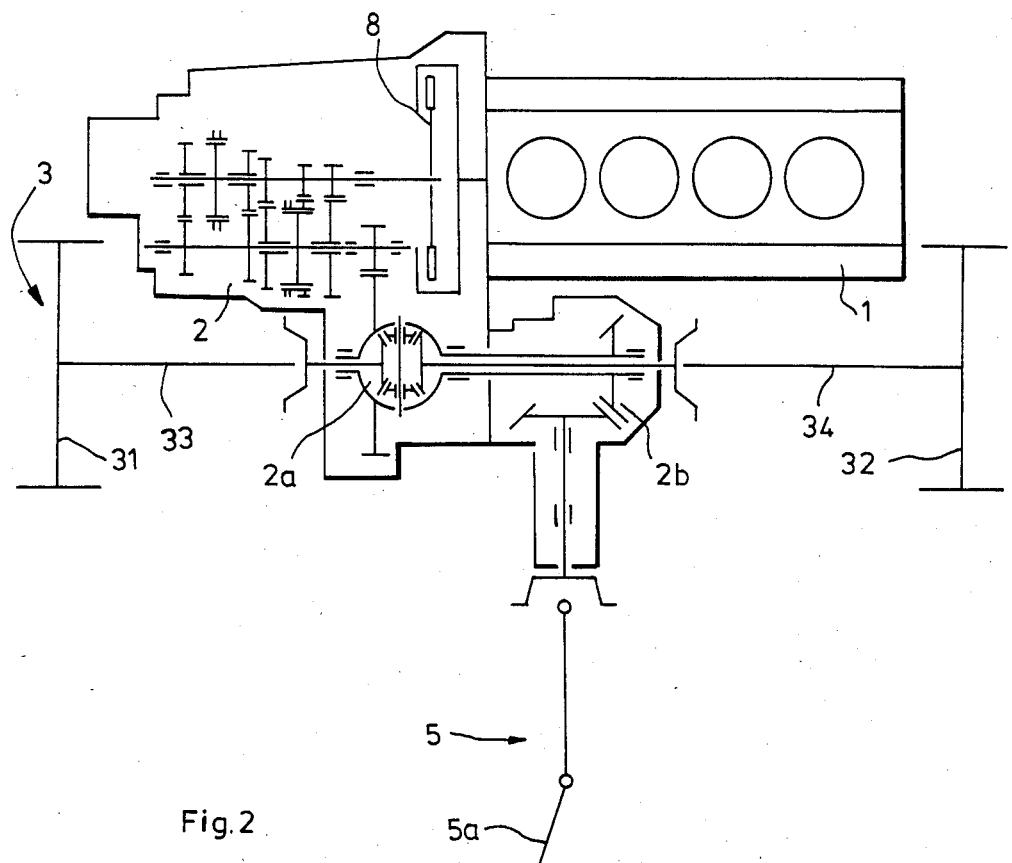
Fig. 2
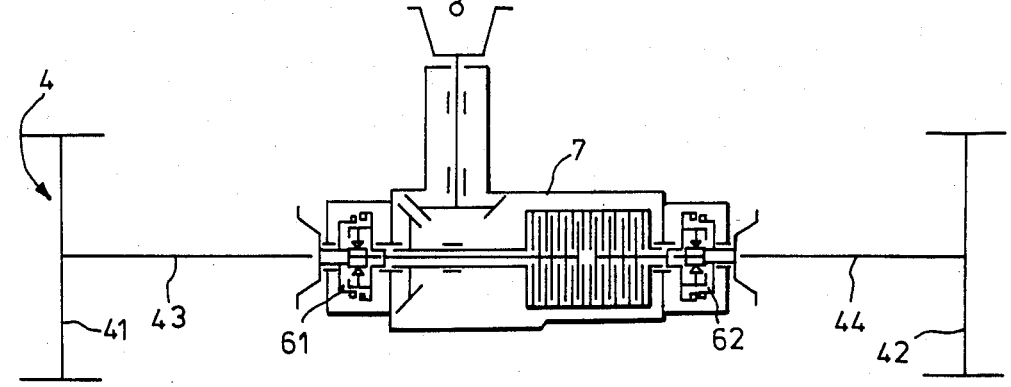

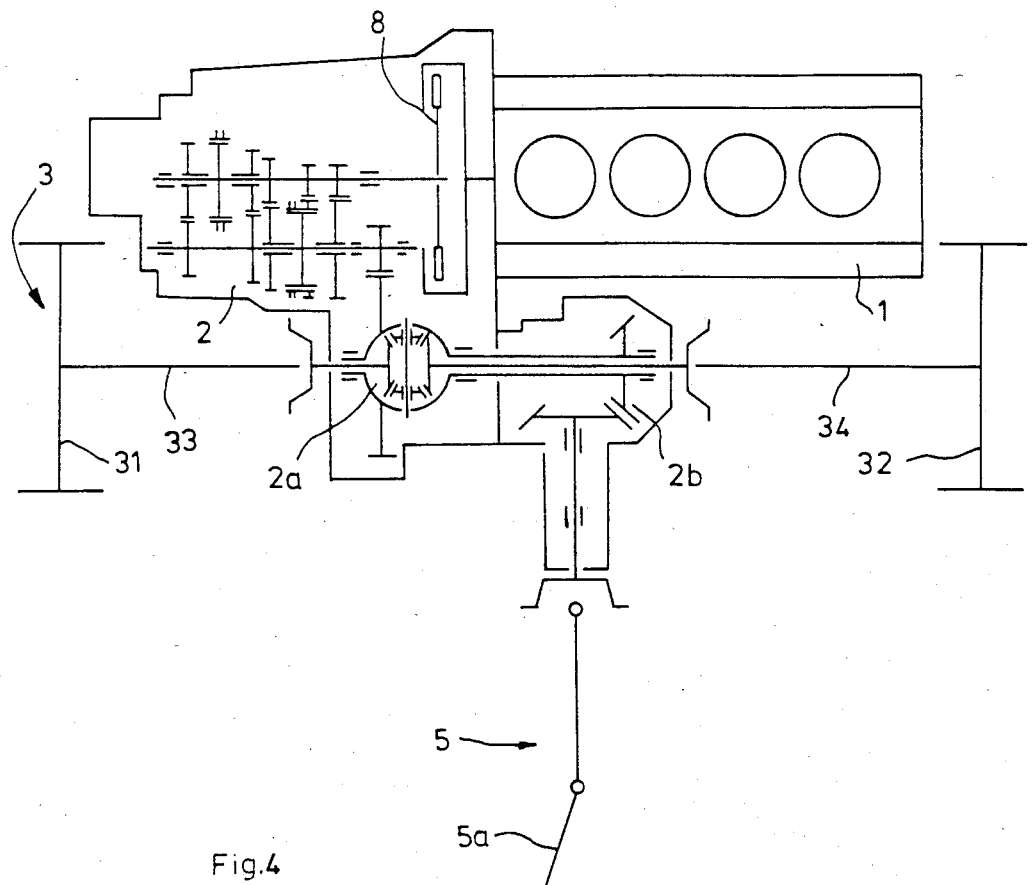
Fig.4
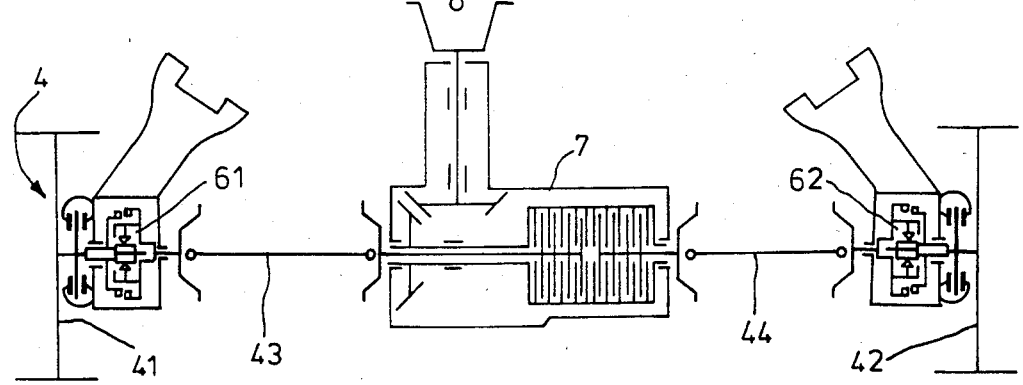

ALL-WHEEL DRIVE SYSTEM FOR VEHICLES

BACKGROUND OF THE INVENTION

The invention relates to all-wheel drive systems for vehicles and, more particularly, to a new and improved all-wheel drive system having a controllable coupling between the front and rear wheels of the vehicle.

All-wheel drive systems for vehicles can be roughly subdivided into two groups, namely, one in which the four wheels are driven permanently, i.e., continuously, independent of road conditions (e.g., the Audi Quattro and Audi 80 Quattro), and one in which the wheels of one axle are driven continuously and the wheels of the other axle are driven only at certain times such as during cross country driving. In the latter case, the connection of the second axle drive occurs either automatically by means of a mechanical overrunning device when a predetermined slippage of the steadily driven axle is exceeded (e.g., German Pat. No. 892,275; DE-AS No. 1,077,537; DE-OS No. 2,413 288; DE-OS No. 2,928,351), or it is initiated manually by the operator whenever necessary by actuation of a corresponding control lever.

A driving arrangement (e.g., EP OS No. 68,309) whereby the wheels of one axle only are continuously driven by way of a conventional axle drive while the drive for the wheels of the second axle is obtained automatically by means of a viscosity coupling arranged in the driving train between the front and the rear axles corresponds closely to a permanent all-wheel drive system.

Such viscosity couplings transmit only very small torques at small speed differences but transmit very large torques at higher speed differences. Depending on the point of installation within the driving train, such viscosity couplings can therefore assume either the tasks of only a center differential or the tasks of both a center differential and an axle differential. Especially under low traction conditions, which occur when roads are wet, icy, snow-covered or sandy, an all-wheel drive with a viscosity coupling acts, depending on the point of installation, either as a permanent all-wheel drive with a blocked center differential or as permanent all-wheel drive with a blocked center differential and a blocked axle differential.

In general, such a rigid coupling between the driven front and rear wheels provides certain advantages on braking, including shortening of the braking distance. When the front wheels of a vehicle are overbraked, resulting in locking, however, coupling of the two axles also causes the rear wheels to be over-braked and locked through the driving train between the front wheels and the rear wheels. This occurs even though the braking system of a vehicle such as an automobile is usually arranged so that the braking effect is larger on the front axle than on the rear axle, assuring that the front wheels will lock before the maximum possible braking forces are attained on the rear wheels. It is known that locking of the rear wheels leads to loss of driving stability.

Accordingly, it is an object of the present invention to provide an improved all-wheel drive system for vehicles having driving wheels which are connected permanently and, in particular, to provide such a system in which the driving stability of the vehicle is not impaired even on overbraking of the front wheels.

SUMMARY OF THE INVENTION

In accordance with the invention, an all-wheel drive system for vehicles includes a device for uncoupling the drive train between the front and rear wheels of the vehicle in accordance with the applied torque, such that a decrease in the rotational speed of the front wheels of the vehicle can not be transmitted to the rear wheels through the driving connection between them. Accordingly, when the service brake is actuated with a rigid coupling between the front and the rear wheels, the system of the invention responds to the braking action on the front wheels so as to uncouple the rear wheels so that any overbraking of the front wheels can not be transmitted to the rear wheels through the driving train.

Although some automobiles with all-wheel drive include a device between the front and the rear wheels that can be coupled and uncoupled so that a decrease in the rotational speed of the front wheels is not transmitted to the rear wheels through the driving train, they do not correspond to the system of the present invention.

For example, a known automobile of this kind (DE-OS No. 2,413,288) has a constantly driven front axle and a rear axle which becomes coupled automatically, by means of a blockable mechanical overrunning device, when the front axle slippage reaches about 5 to 15%. Basically, this known automobile is a conventional front-driven automobile which has an all-wheel drive only when it is driven under unfavorable conditions, in particular rough terrain. Under those conditions the overrunning device merely assumes the task of the manual shift lever, normally actuated by the operator, for connecting in the second axle to the driven axle. Thus it is not a permanent all-wheel drive system. In case of known automobiles with permanent all-wheel drives in which both the front and the rear wheels are driven even during normal operation, there is no overrunning device since it is not required for all-wheel drive operation. It would therefore, seem inappropriate to those skilled in the art to provide such permanent all-wheel drive vehicles with an uncoupling device and it would not be apparent to do so in order to prevent a decrease in the rotational speed of the front wheels, in particular, one caused by the service brake, to be transmitted through the driving train to the rear wheels. Such an arrangement therefore is contrary to the teachings of the art.

All-wheel drive automobiles are also known (DE-OS No. 3,127,605) wherein the front and the rear wheels are normally driven constantly and wherein an engageable and disengageable clutch is inserted between the driving axles of the front and the rear wheels. These automobiles are intended only for racing and rally operations. The clutch which is provided serves to enable the operator to disengage the front wheel drive during operation so that subsequently, by actuation of the hand brake, he may lock the rear wheels when initiating a narrow curve, such as is customary in racing and rallye operation. This known all-wheel concept could not contribute anything to the solution of the problem solved by the invention, for it is precisely the aim of that arrangement to permit what is to be prevented by the subject of the application, namely, the locking of the rear wheels.

BRIEF DESCRIPTION OF THE DRAWINGS

The invention will be explained in detail in the following description with reference to the drawings, in which:

FIG. 2 is a similar schematic diagram illustrating another embodiment of the drive system of the invention;

FIG. 4 is a schematic diagram of a further embodiment of the drive system of the invention in which the coupling means is located adjacent the rear wheels.

DESCRIPTION OF PREFERRED EMBODIMENTS

Figure 1:
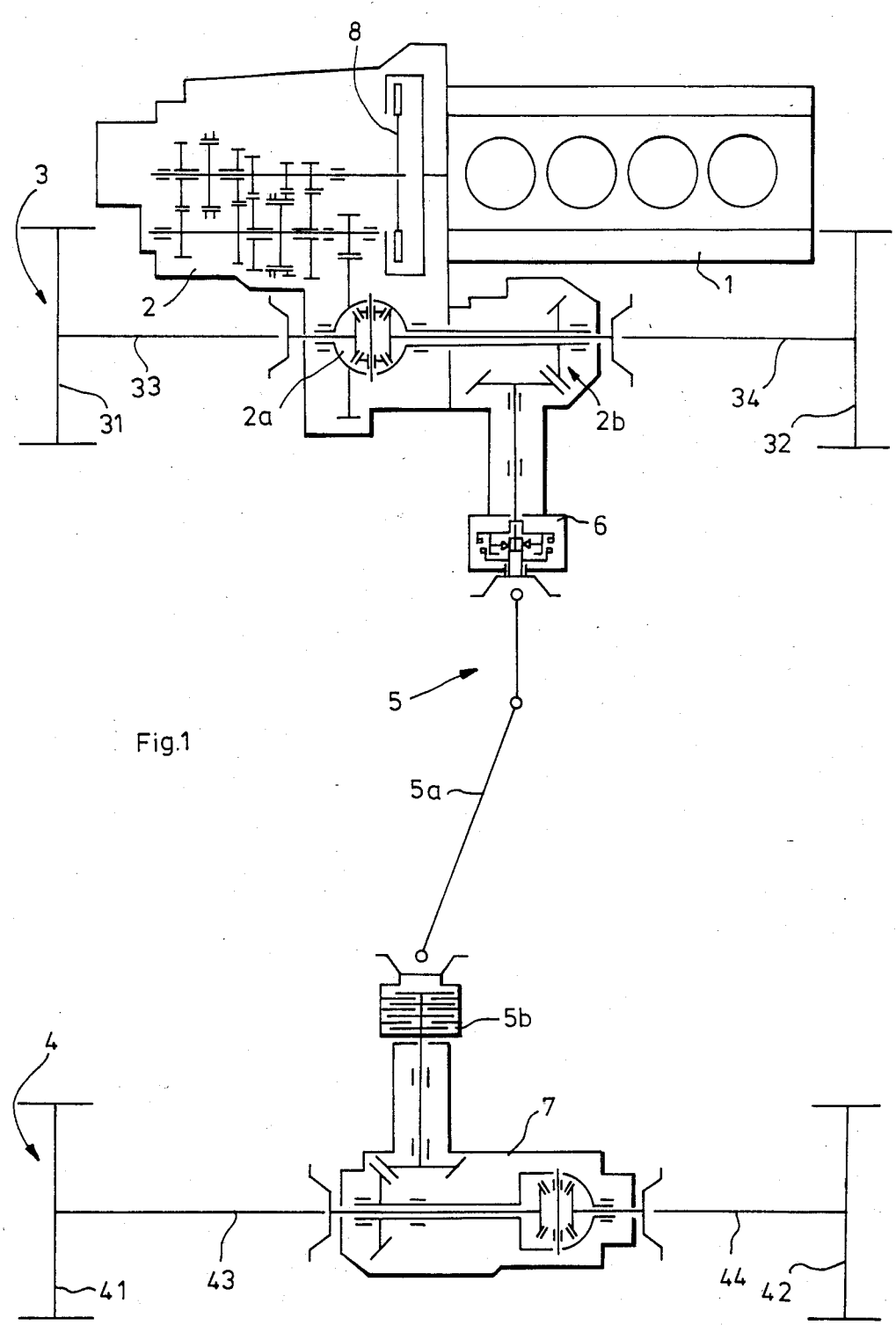
FIG. 1 is a schematic diagram illustrating one embodiment of an all-wheel drive system according to the invention.
Figure 3:
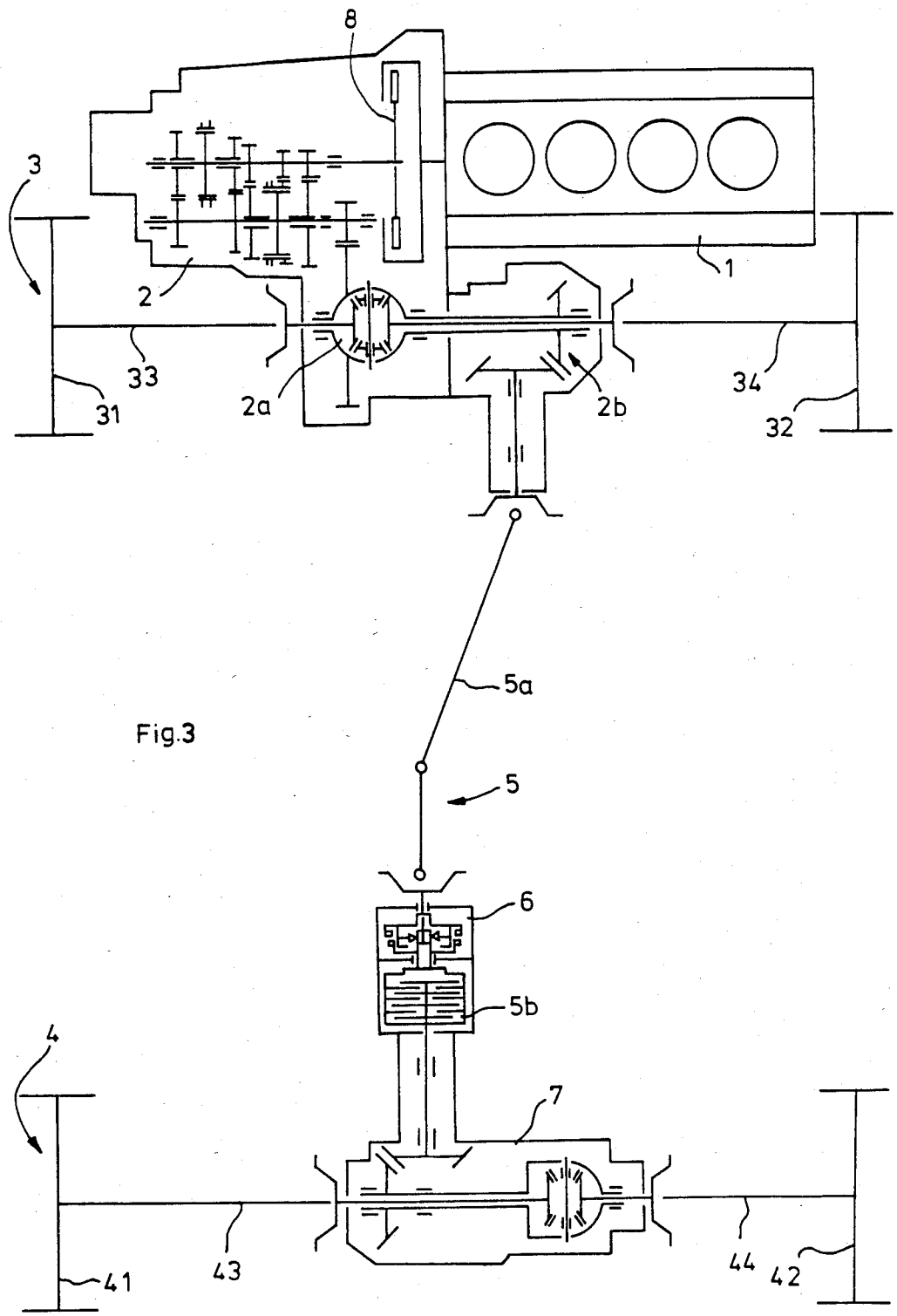
FIG. 3 Illustrates schematically a further embodiment of the drive system of the invention in which the coupling means is located at the output from the universal shaft to the rear axle.

In the representative embodiment of the invention shown in FIG. 1, a driving engine 1 having a clutch 8 for connection to a transmission 2 is arranged in the front of a vehicle so that the wheels 31 and 32 of the front axle 3 are driven through a differential 2a and corresponding shafts 33 and 34 whenever the clutch and transmission are engaged.

The rear axle 4 of the vehicle has wheels 41 and 42. These are driven by means of a driving train 5 coupled to the front axle differential 2a by means of a bevel gear arrangement 2b and similarly to a rear axle differential 7 which is connected to the rear wheels 41 and 42 through corresponding drive shafts 43 and 44. Within the driving train there is a viscosity coupling 5b located at the input of the rear axle differential 7. Such a viscosity coupling has the property of transmitting only small torques if the speed differences are small between its input and output shaft. However, it is able to transmit large torques if larger speed differences between the input and the output occur. Thus, when the steadily and directly driven front wheels 31 and 32 rotate with very small slippage due to very good road conditions, i.e., when the rotational speed of the front and the rear wheels is at least approximately equal, the viscosity coupling will transmit practically no torque and thus, the rear axle will follow the front axle with no significant driving action. Under different conditions, in particular on wet, snow-covered or icy roads, for travel on which it is recommended that the center differential of an automobile with a permanent four-wheel drive be blocked, the viscosity coupling 5b, in contrast to the good road conditions, will produce a rigid, torque-transmitting connection between its input and output. Under such operating conditions, locking of the front wheels due to overbraking would therefore normally result in a corresponding locking of the rear wheels by way of the driving train 5.

In accordance with the invention, a device 6 is provided for coupling and uncoupling the driving train 5 based on the torque transmitted between the front axle 3 and the rear axle 4. The device 6 is constructed so that a decrease in the rotational speed of the front wheels 31 and 32, caused in particular by actuation of the service brake, can not be transmitted to the rear wheels 41 and 42 via the driving train 5. In the representative embodiment shown in FIG. 1, the device 6 is arranged at the input to a universal shaft 5a leading to the rear axle. It is apparent that the device 6 can also be located at any other point in the driving train 5, such as at the output of the universal shaft 5a at the rear axle differential 7.

In the illustrated embodiment, the device 6 constitutes an overrunning device which is automatically coupled and uncoupled according to the direction of the torque, e.g., such as a grip roller overrunning device.

Because of the presence of the overrunning device 6 in the otherwise permanent all-wheel drive system, the possibility that locking of the front wheels 31 and 32 could cause locking of the rear wheels 41 and 42 through the driving train 5 is eliminated since the overrunning device automatically interrupts the transmission of torque in this direction through the drive train.

In order to facilitate an all-wheel drive even when the vehicle is driven backward, the overrunning device 6 is preferably designed so that it can be blocked, either manually or automatically, when the reverse gear is engaged.

As an alternative to the illustrated device 6, it is also possible to use a controllable clutch which is disengaged automatically on actuation of the service brake (foot brake). This may be accomplished, for example, by a control signal, generated by actuation of the service brake, which causes actuation of the clutch in a known manner, e.g., either hydraulically or electromagnetically.

Instead of a single coupling device 6 located in the drive train 5 a similar coupling device may be located in each of the driving trains 43 and 44 leading from the rear axle differential 7 to the rear wheels 41 and 42. One such arrangement is illustrated in FIG. 2 in which two devices 61 and 62, similar to the device 6 of FIG. 1, are arranged at the input of the two drive shafts 43 and 44 of the rear axle differential 7. Obviously, it is also possible to arrange these devices at the output of the drive shaft 43 and 44 adjacent to the rear wheels 41 and 42.

As explained with reference to the device 6 in the embodiment illustrated in FIG. 1, the devices 61 and 62 may be constructed either as overrunning devices capable of being coupled and uncoupled automatically or as controllable clutches.

Use of two overrunning devices or clutches in the driving trains leading from the rear axle differential to the rear wheels is of special advantage in case the rear axle differential is constructed in the manner of a known limited slip differential or torque splitter (EP-OS No. 68,309) which operates as an automatically blockable center differential as well as an automatically controllable rear axle differential and permits only small speed differences between the two wheels of the said axle. Utilization of the devices 61 and 62 in such vehicles not only ensures that a decrease in the rotational speed, and thereby also a locking, of the front wheels, caused in particular by actuation of the service brake, is not transferred to the rear wheels via the driving train, it also prevents locking of one of the wheels of the rear axle running on a surface with low traction from causing premature over-braking of the other wheel of the rear axle which is running on a surface with a high traction. If, for example, the wheels 41 and 42 were rigidly connected with each other by means of a blockable differential or the like, the wheel running on a good surface would be braked not only by its own wheel brake but also the brake of the prematurely locked wheel through the rigid drive shaft coupling.

Although the invention has been described herein with reference to specific embodiments, many modifications and variations therein will readily occur to those skilled in the art. Accordingly, all such variations are included within the intended scope of the invention as defined by the following claims.

We claim:

1. In an all-wheel drive system for a vehicle comprising a front axle with front wheels and a rear axle with rear wheels, the front wheels being continuously driven by a conventional live axle drive comprising a positive differential gear and the rear wheels being automatically driven with said front wheels by a drive train having viscous fluid coupling means therein, the improvement comprising at least one coupling means in said drive train responsive to the direction of a torque applied thereto to automatically interrupt said drive train so as to prevent braking effects on the front wheels from being transmitted to the rear wheels by way of the drive train.

2. An all-wheel drive system according to claim 1 wherein the drive train includes a universal shaft leading to the rear axle and having opposite ends near and away from the rear axle, respectively, and the coupling means is interposed in the drive train at one of said ends of the universal shaft.

3. An all-wheel drive system according to claim 2 wherein the coupling means is interposed in the drive train at the end of the universal shaft away from the rear axle.

4. An all-wheel drive system according to claim 2 wherein the coupling means is interposed in the drive train at the end of the universal shaft near the rear axle.

5. An all-wheel drive system according to claim 1 wherein the drive train includes a universal shaft leading to the rear axle and two drive shafts leading, respectively, to each of the rear wheels and each having an end near and an end away from its respective wheel and wherein said coupling means comprises coupling elements interposed in said drive train at one end of each of said drive shafts, said coupling elements being responsive to the direction of torque applied thereto for interrupting said drive train so as to prevent braking effects on the front wheels from being transmitted to the rear wheels by way of the drive train.

6. An all-wheel drive system according to claim 5 wherein said respective coupling elements are interposed in the drive train at the ends of the respective drive shafts away from the rear wheels.

7. An all-wheel drive system according to claim 5 wherein said respective coupling elements are interposed in the drive train at the ends of the respective drive shafts adjacent to the rear wheels.

8. An all-wheel drive system according to any of claims 1-7, wherein the coupling means comprises overrunning means arranged to be automatically coupled and uncoupled in response to the direction of the torque applied thereto.

* * * * *